April 7, 1936.　　　　　D. E. JOHNSON　　　　　2,036,758
PROCESS OF AND MACHINE FOR FORMING HEADED MACHINE PARTS
Filed July 27, 1932　　　　　2 Sheets-Sheet 1
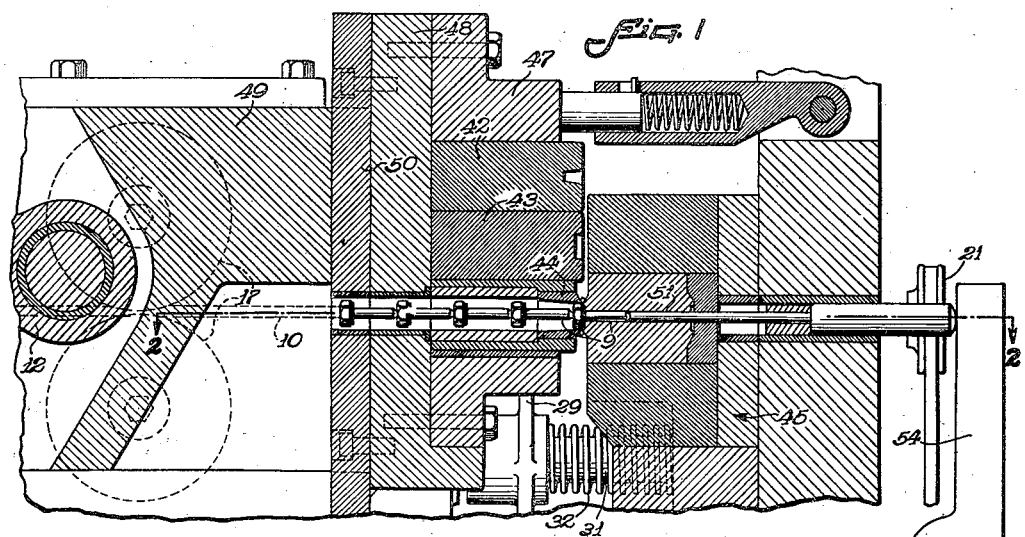
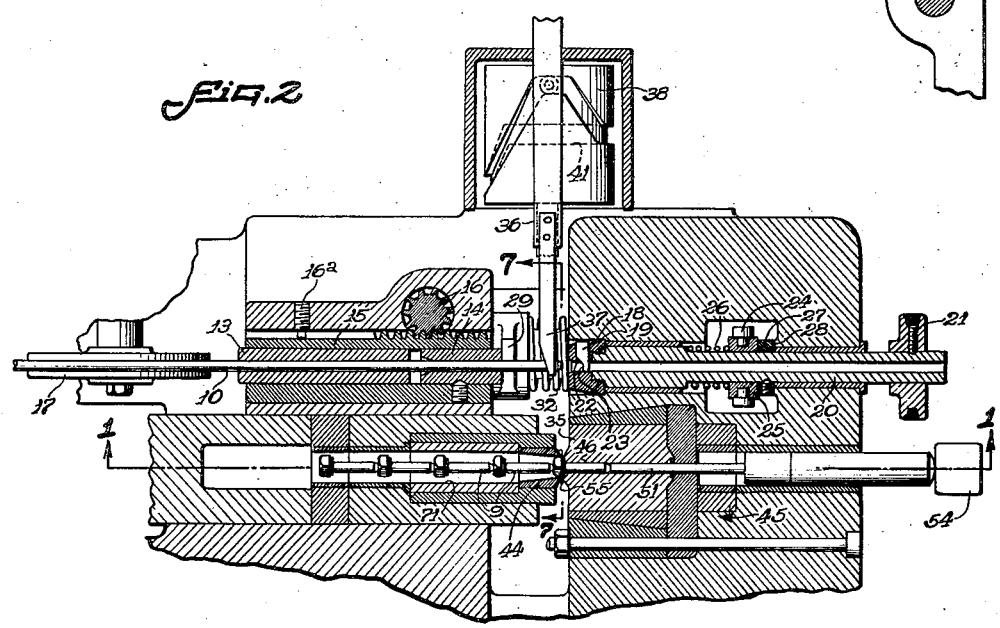
 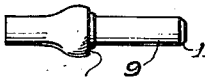  
Inventor
David E. Johnson
By Churchill, Parker & Carlson
Attorneys April 7, 1936. D. E. JOHNSON 2,036,758
PROCESS OF AND MACHINE FOR FORMING HEADED MACHINE PARTS
Filed July 27, 1932 2 Sheets-Sheet 2
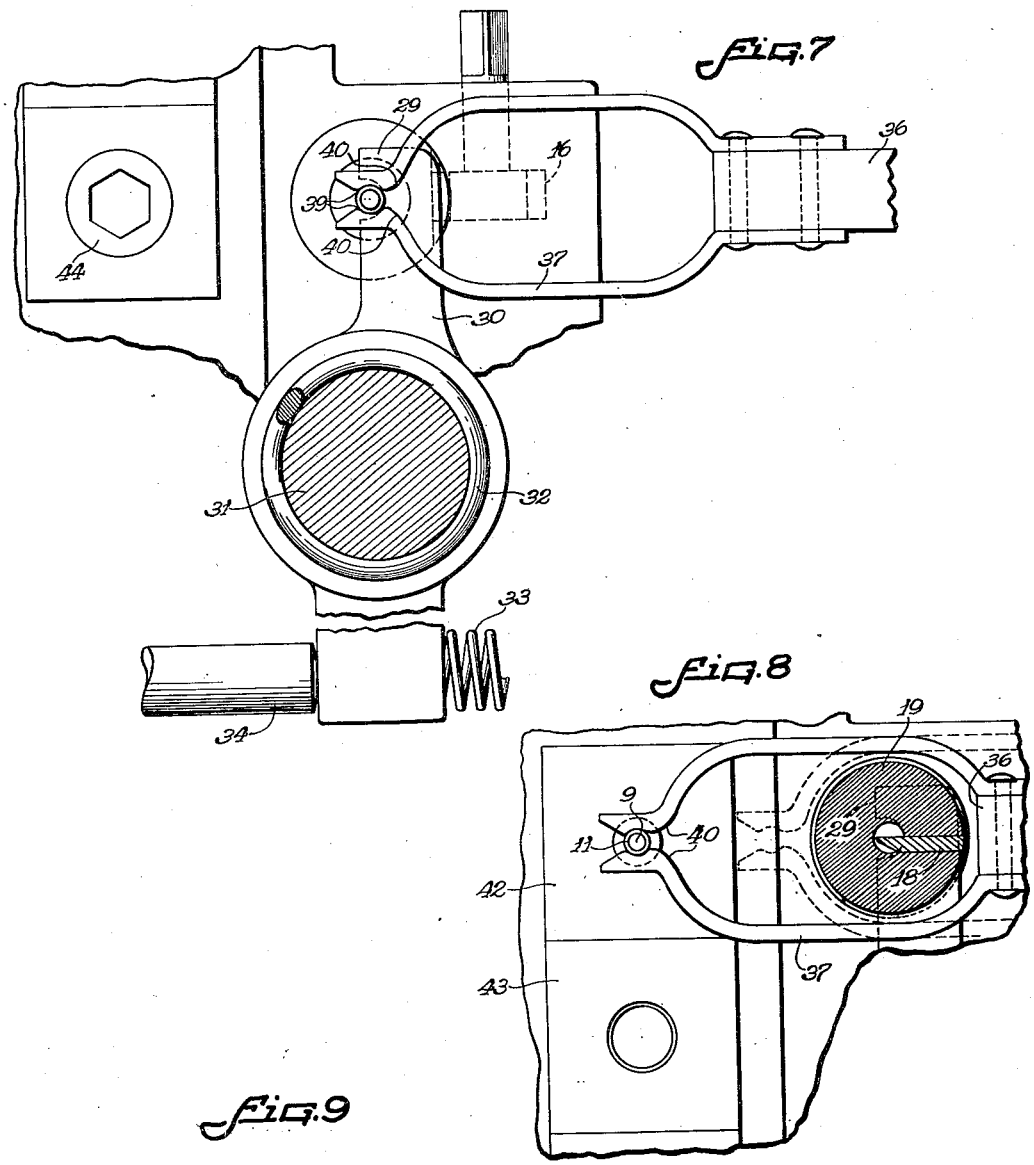
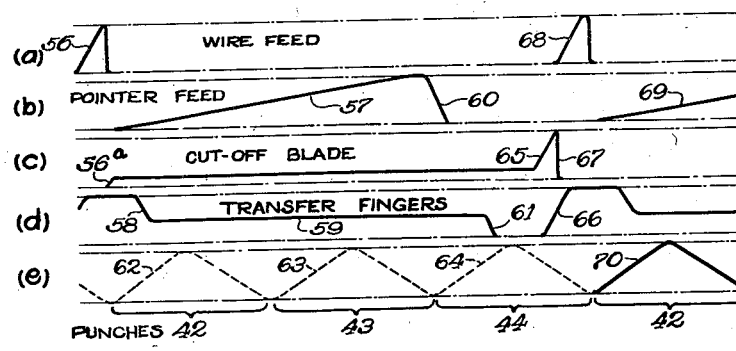
Inventor
David E. Johnson
By Chindall, Parker & Carlson
Attorneys Patented Apr. 7, 1936

2,036,758

UNITED STATES PATENT OFFICE 2,036,758

PROCESS OF AND MACHINE FOR FORMING HEADED MACHINE PARTS

David E. Johnson, Rockford, Ill.

Application July 27, 1932, Serial No. 624,926

19 Claims. (Cl. 10—27)

This invention relates to the formation of headed machine parts such as bolts, screws and the like.

In the manufacture of bolts and screws, according to present practice, work pieces cut from a length of wire are headed in one machine and pointed or formed with a tapered or rounded surface at the opposite end in a separate machine after which the shanks are threaded. Due to the difficulty experienced in regaining control of the headed part and positioning the same for pointing, the time and labor costs are unduly high according to present practice and unnecessary and bulky apparatus is required.

The primary object of the present invention is to simplify the apparatus required for and reduce the cost of manufacturing headed machine parts through the provision of a novel method of and machine for carrying on the heading and pointing operations in succession without losing control of the movements of the work-pieces.

Another object is to provide a combined heading and pointing machine in which pointing of the work-piece is effected prior to the heading operation.

A more detailed object is to provide a combined heading and pointing machine in which the pointing operation is performed before the work-piece is severed from the wire stock.

A further object is to provide a combined heading and pointing machine in which the operation of heading one work-piece is carried on during the pointing of an adjacent work-piece.

The invention also resides in the novel character of the pointing mechanism and the means for transferring the work-piece from one position to another.

Other objects and advantages of the invention will become apparent from the following detailed description taken in connection with the accompanying drawings, in which Figure 1 is a vertical sectional view of a machine embodying the features of the present invention, the section being taken along the line 1—1 of Fig. 2.

Fig. 2 is a sectional view taken along the line 2—2 of Fig. 1.

Figs. 3, 4, 5 and 6 are elevational views of a work-piece in successive stages of its formation.

Fig. 7 is a sectional view taken along the line 7—7 of Fig. 2.

Fig. 8 is a similar view with the parts in different positions.

Fig. 9 comprises a series of charts showing the timed relation in which the various operations of the machine occur.

The process contemplated by the present invention involves generally cutting successive work-pieces 9 from a length of wire stock 10, transferring the pieces successively through a plurality of positions while retaining positive control of the movements of the individual work-pieces and maintaining them in the order of their formation, pointing or forming a taper 11 at one end of each work-piece while disposed in one position, and forming a head on the opposite end of the work-piece in another of said positions. While, for reasons to appear later, it is preferred to point the work-pieces before heading thereof, the invention, in its broader aspects, contemplates pointing after heading so long as the movements of the work-pieces are retained within the control required in order to position the work-piece for heading.

In the present instance, the improved process is carried out in a machine constructed similar to present day heading machines in which the operating cycles of the machine are timed with respect to the rotation of a crank-shaft (not shown) by which a connecting rod 12 (Fig. 1) is reciprocated to effect the different head-forming operations. The wire stock from which successive work-pieces are cut is led through and supported by hardened bushings 13 and 14 in a sleeve 15 having rack teeth formed thereon to permit of longitudinal adjustment of the bushing 14 by rotation of a pinion 16. The latter may be turned after loosening a set screw 16a by which the bushing 14 is held in adjusted position. Periodic advance of the stock through the bushing is accomplished by grooved rollers 17 gripping opposite sides of the wire and driven with a step-by-step motion by a ratchet or other well known mechanism actuated in timed relation to the crank-shaft movements.

After advance of the wire stock in the manner above described, the end thereof is pointed, that is, formed with the short frusto-conical taper 11 or with an end surface of any other continuous annular shape which can be formed by relative rotary motion between the work piece and a metal removing tool about the axis of the work piece. Herein the tool is in the form of a blade 18 mounted at the base of a tapered guide socket in a head 19 fast on a spindle 20 constantly driven as by a belt extending around a pulley 21. The surface 11 is formed by an edge 22 on the blade while an edge 23 is adapted to cut off the extreme end of wire and thereby determine the proper length of the work-piece.

In order that the work-piece may be severed from the main body of the wire stock and advanced laterally without retracting the wire after pointing, the pointing tool is arranged to be moved toward and away from the end of the wire. This is accomplished herein by movement of a yoke 24 toward the wire and in timed relation to the movement of the crank-shaft by which the machine cycles are governed. The yoke actuates a collar 25 which through the medium of a spring 26 shifts the spindle 20 axially, feeding the blade 18 yieldingly into engagement with the advanced end of the wire. Owing to the yielding pressure thus applied, there is no danger of damage being done to the tool in the event that the wire is advanced more than the required distance by the feed rollers 17. In the latter event, an additional amount of metal is cut from the end of the wire, thereby forming the taper 11 in the proper position in spite of any inaccuracies in the wire feed. When the yoke is retracted, the collar engages a flange 27 on the spindle which is moved positively until the flange encounters an abutment 28.

The pointing operation above described occurs while the portion of the wire from which the work-piece is formed is still integral with the main body of the wire, advantage thus being taken of the accurate and firm support afforded by the bushing 14. In this way, no special support is required for the work-piece during pointing.

In the present instance, the work-piece is severed from the main body of the wire by means of a shearing blade 29 on the free end of an arm 30 yieldably urged against the end of the bushing 14 and movable transversely thereof to cut off successive work-pieces. To this end, the arm is pivoted loosely on a stud 31 and urged toward the bushing by a spring 32, the position of the arm on the stud thus being determined by the position of the bushing 14. A spring 33 acting on the arm 30 urges the latter into the retracted position shown in Fig. 7 and actuation of the arm to shear off the work-piece is effected through the medium of a rod 34 operated by a cam motion timed by the crank-shaft. Since the blade 29 is maintained by the spring 32 in abutment with the bushing 14, the length of the work-pieces to be formed may be varied simply by shifting the bushing 14 axially through the medium of the pinion 16 and adjusting the feed by the rollers 17.

Means may be provided for holding the projected end of the wire against twisting during operation of the pointing tool thereon. The shearing blade 30 may be utilized conveniently to perform this function simply by advancing the same partially through the wire and maintaining such position of the blade while the pointing tool is in engagement with the work. A flattened or slightly curved indentation is thus formed in the wire upon which indentation the cutting edge of the blade acts to hold the wire against twisting under the torsional stress applied thereto by the pointing tool.

Before the actual shearing of the work-piece occurs, but after the pointing tool has been withdrawn from the tapered end thereof, the work-piece is gripped by a transfer mechanism by which it is carried laterally from the pointing position above referred to (see Fig. 2) to a position opposite a die 35 in which the work-piece is supported during heading of its opposite end. In this present instance, this mechanism comprises an arm 36 having a pair of elongated yieldable fingers 37 secured at one of their ends to the arm. The arm is guided for endwise movement perpendicular to the projected end of the wire and constitutes the follower of a cam 38 which makes one revolution in each cycle of the machine. The free ends of the fingers normally tend to move toward each other and are formed with closely spaced sockets 39 into which the work-piece is guided by converging surfaces 40 as the arm is retracted to the position shown in Figs. 2 and 7. The fingers are thus tensioned and firmly grip the work-piece. In each cycle, the cam 38 moves the arm quickly from the position shown in Figs. 2 and 7 to that shown in Fig. 8 after which the arm is retracted to the position shown in dotted outline in Fig. 8 when a surface 41 on the cam permits the arm to dwell during pointing of the next work-piece, final retraction of the arm occurring after the pointing tool has been withdrawn. In this way, the fingers 37 may grip the work-piece close to the tapered end thereby facilitating accurate positioning of the work-piece for entry into the die 35.

Operation of the pointing tool on one work-piece before retraction of the transfer mechanism is made possible by spacing the fingers 37 far enough apart that they do not, when in advanced position, block the pointing tool from advance toward the wire. A maximum portion of the cycle is thus allotted for the pointing operation enabling the taper 11 to be shaped and positioned properly.

While the work-piece formed and pointed as above described may be headed in any preferred manner, this is accomplished in the embodiment herein disclosed by the action of three separate punches 42, 43 and 44 while the blank is supported by the die 35. The latter is mounted in a retaining block 45 at the same level as the pointing tool and has a longitudinal bore 46 with which the tapered end of the work-piece becomes alined in the advanced position of the transfer mechanism. Herein the punches are mounted in vertically spaced relation in a holder 47 backed by the usual anvil 48 arranged to be reciprocated by a ram 49 connected to the connecting rod 12. Interposed between the ram and the anvil is a transfer slide 50 which is raised and lowered by suitable cam mechanism actuated in timed relation to the movements of the crank-shaft and adapted, in each operating cycle of the machine to bring the recesses in the punches 42, 43 and 44 successively into alinement with the bore 46 of the die. When the punch 42 is opposite the die 35, a work-piece is supported by the fingers 37 with the pointed end opposite the bore 46 and in alinement therewith. In the initial advancing movement of the punch, the work-piece is engaged by the punch 42 which forces the tapered end into the bore until it abuts against the end of a then stationary pin 51 leaving the opposite end projecting beyond the face of the die 35 as the fingers 37 are retracted. In the final movement of the punch 42, the projecting end is upset as shown in Fig. 4, forming a shoulder 52 at the face of the die 35. By means of the punch 43, a head 53 (Fig. 5) of cylindrical shape is then formed. Finally this head is trimmed to the desired polygonal shape (Fig. 6) by the punch 44.

The trimming operation and ejection of the work-piece from the die 35 are accomplished by actuation of a lever 54 in timed relation to the machine cycle. Forward movement of the ejector pin forces the work-piece into the trimming punch so that the piece becomes separated from the trimming 55 as the punch 44 moves away from the die 35.

The position of the ejector pin 51, it will be observed, determines the distance to which the work-piece enters the die 35 under the force of the upsetting punch. While the force of the upsetting operation is sustained by the ejector pin acting upon the pointed end of the work-piece, the latter is capable of withstanding this force without disfigurement owing to the flatness and substantial size of its end surface. With differently shaped points on the work-piece, it may be desirable to form a seat or recess in the end of the ejector pin corresponding in shape to that of the pointed surface.

The operation of the combined heading and pointing machine will now be described with reference to the time charts shown in Fig. 9, the ordinates of which represent movements of the cam followers by which the different parts above referred to are actuated. From chart e, it will be apparent that three revolutions of the main crank shaft occur during each machine cycle in which one work-piece is completed. The first operation performed in the formation of each headed part is the feeding of the wire 10 forwardly as indicated at 56 (chart a) which occurs while the transfer mechanism is holding the previously formed blank in position (see Fig. 8) opposite the die 35 and substantially simultaneously with the initial movement of the ram 49 to advance the upsetting punch 42 toward the die. Following the advance of the wire 10, the shearing blade 30 is advanced partially through the wire as indicated at 56ª (chart c) thereby gripping the wire so as to hold the same against twisting. Substantially simultaneously the pointing tool 18 is advanced as indicated by the line 57 (chart b) while the fingers 37 are partially retracted as indicated at 58 (chart d) and dwelling in the intermediate position as indicated at 59. A substantial interval is allotted for formation of the surface 11 after which the tool is retracted as indicated at 60. Then the fingers 37 move to the position shown in Fig. 7 as indicated at 61. The fingers are thus spread apart, the wire becoming seated in the sockets 39.

The movements above described are completed while the preceding work-piece is being upset, as indicated at 62 (chart e), headed as shown at 63, and trimmed as indicated at 64. As soon as the previous work-piece has been trimmed and ejected, further movement of the cut-off blade 29 starts as indicated at 65 (chart c) to entirely sever the pointed work-piece from the main length of wire. This motion is a rapid one and simultaneously therewith the transfer fingers 37 start to move the work-piece from the pointing position (Fig. 7) to the heading position (Fig. 8), this motion being represented by the line 66 (chart d). As indicated at 67 (chart c), the cut-off blade is retracted immediately so that the wire 10 and the pointing tool 18 may be fed forwardly as indicated at 68 and 69 to form the next work-piece, this being permitted by virtue of the elongated recess provided between the fingers 37.

When brought into heading position in the manner above described, the newly formed work-piece is alined with the bore of the die 35, the slide 50 having been lowered to position the punch 42 opposite the die 35. Upon the next forward movement of the ram 49 represented by the line 70 (chart e), the end of the work-piece remote from the die 35 enters the conical recess in the punch 42 and upon being engaged thereby, the tapered end is forced into the bore 46 until the end abuts against the pin 51 which is then in advanced position. In the final movement of the punch 42, the end of the work-piece projecting from the die is upset to form the conical head shown in Fig. 4.

During the next forward motion of the ram 49, the punch 43 is positioned opposite the work-piece and forms the head 53, the position of the work-piece remaining fixed in the die 35. Trimming takes place in the next stroke of the ram 49 with the punch 44 alined with the work-piece. In this operation, the end of the punch 44 stops short of the die 35, the major portion of the head being trimmed forming the ring 55 which becomes pinched between the faces of the die and the punch. As the punch reaches its advanced position, the ejector pin 51 is actuated forcing the work-piece into the punch 44 causing the base of the head to be trimmed by the punch, the work-piece then being completed as shown in Fig. 6. When the punch 44 is retracted, the ring 55 falls down between the punch and die and thus becomes separated from the finished work-piece which is advanced step-by-step through the bore 71 as successive work-pieces are finished.

From the foregoing, it will be apparent that the successive work-pieces cut from wire stock are maintained in a predetermined order while being advanced through the pointing and heading positions and their movements and positions are controlled positively and accurately. Thus, during pointing, the work-piece is integral with the main body of wire 10 so that the bushing 14 forms a firm support. Then the piece is gripped by the fingers 37 and held thereby until the pointed end has been forced into the die 35 by the upsetting punch 42. Finally the pieces are forced through the trimming punch 44 in the order of their formation. While it is preferred for the reasons above described to point the work-pieces prior to heading, it will be apparent that the pointing might be effected after the pieces leave the trimming punch 44 in which case advantage would still be taken of the positive control over the pieces which is necessary in order to support them for heading.

The terms "wire stock sections" are used in the appended claims in a generic sense and are intended to include longitudinal sections of a length of wire either before or after separation from each other.

I claim as my invention:

1. A combined machine for heading and pointing machine parts comprising, in combination, means supporting a length of wire and advancing the same step-by-step in an endwise direction, a rotary cutting tool adapted to be shifted axially toward and into engagement with the advanced end of the wire whereby to form a taper thereon, means operable after the formation of said taper to cut off a predetermined length of the wire, a stationary die having a bore extending parallel to said wire and shorter than the piece cut therefrom, transfer mechanism operable to grip the wire adjacent said tapered end after retraction of said tool and prior to severing of said piece and then to shift the piece laterally into a position in alinement with said bore, a plurality of head-forming punches arranged to be presented successively to the end of said piece projecting beyond said die whereby to force the tapered end of said piece into said die and to form and trim a head on the opposite end of the piece, and means for ejecting the finished piece from said die through a bore in the last of the punches acting on the piece.

2. A combined machine for heading and pointing machine parts comprising, in combination, means supporting a length of wire and advancing the same step-by-step in an endwise direction, a tool adapted to engage the advanced end thereof and form a point thereon, means operable after the formation of said taper to cut off a predetermined length of the wire, a stationary die having a bore extending parallel to said wire and shorter than the piece cut therefrom, transfer mechanism operable to grip the wire adjacent said tapered end, prior to severing of said piece and then to shift the piece laterally into a position in alinement with said bore with the pointed end adjacent the die, and a punch reciprocable toward and from said die and operable to move the work-piece partially into said die and then to form a head on the projecting end after retraction of said mechanism.

3. A combined pointing and heading machine comprising, in combination, means supporting a length of wire and advancing the same periodically in an endwise direction, a cutter movable toward and from the advanced end of said wire and operable to form a point thereon, a stationary die adapted to receive the pointed end of said wire, a heading punch alined with said die, means for severing a predetermined length from the end portion of said wire and transferring the severed piece laterally to a position in alinement with said die, means for effecting relative reciprocating movement between said die and said punch to force said piece into the die and upset a head on the end projecting from said die, a punch adapted for engagement with the headed end of said piece while supported in said die whereby to trim the head, and means engageable with the pointed end of said work-piece to force the same out of said die through said trimming punch.

4. A combined machine for heading and pointing machine parts comprising, in combination, means supporting a length of wire and advancing the same with a step-by-step movement, means operable to point the advanced end of said wire permitting lateral movement of the pointed end after pointing without retraction of said wire, a die for supporting successive work-pieces during heading thereof, and means operating subsequent to the pointing of said end to cut a predetermined length from said wire and carry the same laterally into a position opposite said die for entry of the pointed end therein.

5. A combined machine for heading and pointing machine parts comprising, in combination, means supporting a length of wire and advancing the same step-by-step in an endwise direction, a pointing device movable toward and away from the advanced end of said wire and operable to form a taper thereon, a die for supporting successive work-pieces during heading thereof and having a bore extending parallel to said wire, a punch movable toward and away from said die to form a head on the work-piece supported thereby, means for cutting a predetermined length from said wire after pointing of the end, and a transfer means operable to grip said wire adjacent the pointed end after retraction of said pointing device and then to advance the severed piece laterally into alinement with said bore, said transfer means retracting to and dwelling in an intermediate position whereby to permit movement of said punch toward said die and movement of said tool toward the advanced end of the wire.

6. A combined machine for heading and pointing machine parts comprising, in combination, means supporting a length of wire, means for cutting successive predetermined lengths from one end of said wire to form a plurality of work-pieces, means gripping the successive pieces before cutting thereof from the wire and transferring each piece to and locating the same accurately in a heading position, means for supporting successive work-pieces in said position whereby to permit retraction of said transfer means, a tool operable by relative rotation between the tool and each work-piece about the axis of the latter to form a point thereon while the work-piece is still integral with the length of wire, and means operable to form a head upon the opposite end of the work-piece when mounted on said supporting means.

7. A combined machine for heading and pointing machine parts comprising, in combination, a pointing tool, a die having a longitudinally extending bore, means for moving a plurality of wire stock sections successively into a position parallel to said bore with one end adapted for engagement by said tool, means operating during engagement of said tool and each work section to effect relative rotation therebetween about the axis of the work section whereby to shape the end of the section, means for gripping the pointed section and transferring the same laterally to a position in alinement with said bore, and means operable to force the pointed end of the section into said bore and form a head on the opposite end thereof.

8. In a machine of the character described, the combination of an axially adjustable support having a length of wire supported therein and projecting from one end thereof, a rotary cutter adapted to form a point on the projected end of said wire and mounted for movement toward and away from the end of said support, means advancing said wire and cutter toward each other whereby to point the end of the wire, a cutting blade carried on said support at the end thereof and arranged to be moved transversely of said end to sever off the projecting end portion of said wire and then to retract immediately, an arm arranged to grip said wire adjacent the point after retraction of said cutter and to move the severed piece in a lateral direction out of pointing position, said arm being disposed out of the path of said cutter when in advanced position whereby to permit feeding of the cutter into engagement with the severed end of said wire.

9. In a machine of the character described, the combination of a support for a length of wire, means for advancing said wire step-by-step to project predetermined lengths thereof beyond said support, a rotary cutter mounted for axial movement into engagement with the projected end of said wire whereby to form a point thereon, means for cutting off successive lengths of the wire adjacent said support, an arm movable transversely of said wire after retraction of said cutter and having fingers with their free ends adapted to grip the wire adjacent said point and carry the severed piece laterally, the opposite ends of said fingers being spaced apart to permit said cutter to be advanced between them before retraction of the arm.

10. In a machine of the character described, the combination of a support for a length of wire, means for advancing said wire step-by-step to project successive lengths thereof from the support, a rotary cutter for forming a taper on the end of said wire, means for advancing said cutter yieldably into engagement with the end portion of said wire and then retracting the cutter, a blade operable to sever the projecting portion of said wire from said support and then to move to retracted position to permit immediate advance of the wire relative to the support, and means operable upon retraction of said cutter to grip said wire adjacent the tapered end and move the severed piece of wire laterally out of alinement with said cutter.

11. In a machine of the character described, the combination of a support for a length of wire, means for advancing said wire step-by-step to project successive lengths thereof from the support, a rotary cutter for pointing the end of said wire, a shearing blade adjacent said support movable laterally thereof to cut off the projecting end of said wire and then move to retracted position before the next feeding movement of the wire, and an independently movable transfer mechanism operable to grip said projecting end before severing thereof and to shift the severed piece in a lateral direction.

12. In a machine of the character described, the combination of a support for a length of wire, means for advancing said wire step-by-step to project successive lengths thereof from the support, a rotary cutter for forming a taper on the end of said wire, means for advancing said cutter yieldably into engagement with the end portion of said wire and then retracting the cutter, means for cutting off the projecting end of said wire and transferring the same laterally out of the path of the wire, said cutter being shaped to form a taper on the end portion of said wire and to machine off the end thereof in the event that the wire is projected more than a predetermined distance from said support.

13. In a machine of the character described, the combination of a support for a length of wire mounted for adjustment in a direction longitudinally of the wire, means for advancing the wire step-by-step along said support to project the end of the wire beyond the support, a pointing tool movable toward and from the advanced end of the wire and operable to form a taper thereon, a blade movable relative to said support to cut off the projecting end portion of the wire, said blade being mounted on said support whereby adjustment of the support will vary the length of wire cut by said blade, and means for transferring the severed piece in a lateral direction.

14. In a machine of the character described, the combination of a support for a length of wire, means for advancing the wire step-by-step along said support to project the end beyond the support, a rotary pointing tool operable upon the projected end of the wire, a blade adapted to engage the wire immediately beyond said support and to cut off the projected end portions after pointing thereof, said blade being moved into engagement with each work-piece during pointing thereof and acting to hold the wire against twisting by the pointing tool.

15. For forming headed machine parts, the process which comprises feeding a continuous length of wire endwise toward a pointing position, forming a taper on the end of said wire, grasping the wire near said end, severing the wire at a point spaced from the end, while so held, transferring the cut-off piece to a heading position, and forming a head on the severed end of the piece.

16. For forming headed machine parts, the process which comprises feeding a continuous length of wire endwise toward a pointing position, forming a taper on the end of said wire, grasping the wire near said end, shearing off the wire at a point spaced from said end and simultaneously initiating lateral bodily movement of the cut-off piece to another position in the direction of the shearing, and finally performing another operation on the severed end of the piece in said last mentioned position.

17. A combined machine for heading and pointing machine parts comprising, in combination, an axially movable rotary pointing tool, a die having a longitudinal bore extending parallel to the rotational axis of said tool, means for advancing a length of work-piece stock step-by-step to bring the end thereof into operating association with said tool, said tool forming a taper on said end, means operable upon retraction of said tool after pointing said end to separate the end portion of said stock from the remainder thereof and shift the separated piece laterally into alinement with said bore with the pointed end adjacent said die, and means acting upon the opposite end of the piece supported in said die to form a head thereon.

18. A combined machine for heading and pointing machine parts to be formed with screw threaded shanks thereon comprising, in combination, means operable to transfer a series of wire stock and to advance the wire sections successively through at least two operating positions while retaining positive control over the movements of the sections, and pointing and heading means operable upon the sections in the respective operating positions to form a taper on one end in one position and a head upon the opposite end of a section in the other position, said pointing means comprising a positively driven metal cutting tool rotated about the longitudinal axis of the section in pointing position and means to effect relative axial movement between the tool and the section into and out of cutting engagement with each other.

19. A combined machine for heading, trimming and pointing wire stock sections preparatory to threading the shanks thereof to form screws comprising, in combination, pointing means including a rotary cutting tool, heading and trimming means, means for holding a wire stock section in axial alinement with said tool during the pointing operation, means for holding the section during the heading and trimming operations, and means to transfer the sections from one holding means to the next while retaining positive control over the successive sections throughout all of said operations.

DAVID E. JOHNSON.

CERTIFICATE OF CORRECTION.

Patent No. 2,036,758.  April 7, 1936.

DAVID E. JOHNSON.

It is hereby certified that error appears in the printed specification of the above numbered patent requiring correction as follows: Page 5, second column, line 43, claim 18, strike out the words "and to advance the wire"; and that the said Letters Patent should be read with this correction therein that the same may conform to the record of the case in the Patent Office.

Signed and sealed this 5th day May, A. D. 1936.

Leslie Frazer (Seal)  Acting Commissioner of Patents.